United States Patent
Kaneiwa et al.

(10) Patent No.: US 10,850,478 B2
(45) Date of Patent: Dec. 1, 2020

(54) OPTICAL LAMINATE, POLARIZING PLATE, METHOD OF MANUFACTURING POLARIZING PLATE, AND IMAGE DISPLAY DEVICE

(71) Applicant: FUJIFILM Corporation, Tokyo (JP)

(72) Inventors: Hideki Kaneiwa, Kanagawa (JP); Makoto Kamo, Kanagawa (JP); Junichi Hirakata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/922,182

(22) Filed: Mar. 15, 2018

(65) Prior Publication Data
US 2018/0200988 A1 Jul. 19, 2018

Related U.S. Application Data

(63) Continuation of application No. PCT/JP2016/077954, filed on Sep. 23, 2016.

(30) Foreign Application Priority Data

Sep. 25, 2015 (JP) .................................. 2015-188817

(51) Int. Cl.
*G02F 1/1335* (2006.01)
*B32B 7/02* (2019.01)
(Continued)

(52) U.S. Cl.
CPC .................. *B32B 7/02* (2013.01); *G02B 1/14* (2015.01); *G02B 5/3016* (2013.01);
(Continued)

(58) Field of Classification Search
CPC . B32B 7/02; B32B 2307/536; B32B 2307/42; G02B 5/3016; G02B 1/14;
(Continued)

(56) References Cited

U.S. PATENT DOCUMENTS

| 2006/0109550 A1 | 5/2006 | Shimizu | |
| 2016/0047962 A1* | 2/2016 | Kobayashi | ....... B29D 11/00788 |
| | | | 359/489.07 |
| 2016/0077267 A1* | 3/2016 | Inagaki | ................... B32B 23/04 |
| | | | 359/489.07 |

FOREIGN PATENT DOCUMENTS

JP 2006-154768 A 6/2006
JP 2009-043330 A 2/2009
(Continued)

OTHER PUBLICATIONS

Notice of Reasons for Refusal issued by the Japanese Patent Office dated Jan. 22, 2019, in connection with Japanese Patent Application No. 2017-541574.
International Search Report issued in PCT/JP2016/077954 dated Dec. 13, 2016.
Written Opinion issued in PCT/JP2016/077954 dated Dec. 13, 2016.
(Continued)

*Primary Examiner* — Paisley L Wilson
(74) *Attorney, Agent, or Firm* — Edwards Neils LLC; Jean C. Edwards, Esq.

(57) ABSTRACT

An object of the invention is to provide an optical laminate which has excellent workability in the production of a polarizing plate and is capable of suppressing the occurrence of cracks in the polarizing plate, a polarizing plate, a method of manufacturing the polarizing plate using the optical laminate, and an image display device having the polarizing plate. An optical laminate according to the invention has a polarizer, an optical anisotropic layer, and a masking layer in this order, and hardness HB of the masking layer and hardness HA of a layer adjacent to the optical anisotropic layer side of the masking layer satisfy Expression (1):

$$HA \times 0.5 \leq HB \leq HA \times 2 \qquad (1).$$

12 Claims, 4 Drawing Sheets

(51) Int. Cl.
*G02F 1/13363* (2006.01)
*G02B 5/30* (2006.01)
*G02B 1/14* (2015.01)
*B32B 27/36* (2006.01)

(52) U.S. Cl.
CPC ....... *G02B 5/3083* (2013.01); *G02F 1/13363* (2013.01); *G02F 1/133512* (2013.01); *G02F 1/133528* (2013.01); *B32B 27/365* (2013.01); *B32B 2307/42* (2013.01); *B32B 2307/536* (2013.01); *G02B 5/305* (2013.01); *G02F 2001/133541* (2013.01); *G02F 2201/50* (2013.01); *G02F 2201/501* (2013.01)

(58) Field of Classification Search
CPC . G02B 5/3083; G02B 5/305; G02F 1/133512; G02F 1/133528; G02F 1/13363; G02F 2201/501; G02F 2001/133541
See application file for complete search history.

(56) References Cited

FOREIGN PATENT DOCUMENTS

| JP | 2012-027316 A | | 2/2012 |
|---|---|---|---|
| JP | 2013-225080 A | | 10/2013 |
| JP | 2014-006447 A | | 1/2014 |
| JP | 2014006447 A | * | 1/2014 |
| JP | 2014-238533 A | | 12/2014 |
| JP | 2015-138243 A | | 7/2015 |
| JP | 2016-065928 A | | 4/2016 |

OTHER PUBLICATIONS

International Preliminary Report on Patentability completed by WIPO dated Mar. 27, 2018, in connection with International Patent Application No. PCT/JP2016/077954.

* cited by examiner

OPTICAL LAMINATE, POLARIZING PLATE, METHOD OF MANUFACTURING POLARIZING PLATE, AND IMAGE DISPLAY DEVICE

CROSS-REFERENCE TO RELATED APPLICATIONS

This application is a Continuation of PCT International Application No. PCT/JP2016/077954 filed on Sep. 23, 2016, which was published under PCT Article 21(2) in Japanese, and which claims priority under 35 U.S.C. § 119(a) to Japanese Patent Application No. 2015-188817 filed on Sep. 25, 2015. The above applications are hereby expressly incorporated by reference, in their entirety, into the present application.

BACKGROUND OF THE INVENTION

1. Field of the Invention

The present invention relates to an optical laminate, a polarizing plate, a method of manufacturing the polarizing plate, and an image display device having the polarizing plate.

2. Description of the Related Art

In image display devices (e.g., liquid crystal display devices), it is necessary to secure a non-display region in a peripheral portion in order to arrange a gate driver and a source driver.

In the non-display region of the peripheral portion, a masking layer which is generally called a design layer, a colored layer, a printed layer, or the like is provided from the viewpoint of design.

For example, in JP2014-238533A, an optical member which has a front plate, a smoothing layer, a polarizer, and a retardation film in this order, and in which a printed layer is formed in a peripheral portion of a surface of the front plate on the smoothing layer side is described as an optical member which is used in an image display device ([claim 1], [FIG. 1]).

SUMMARY OF THE INVENTION

In recent years, with a reduction in the thickness of image display devices, especially, small- and medium-sized liquid crystal display devices, the thickness of a member (e.g., a polarizing plate) to be used therein is also required to be reduced.

Accordingly, the inventors have considered a configuration without a front plate from the viewpoint of thickness reduction in regard to an optical member (optical laminate) having a masking layer described in JP2014-238533A or the like. However, it has been found that in a case where the front plate is simply removed, problems occur such as chipping of the masking layer or smoothing of a portion in which the masking layer is provided.

Therefore, the inventors have considered providing a masking layer on the inner side (that is, on the display element (e.g., liquid crystal cell) side) of a polarizer (in a liquid crystal display device, a polarizer on the visible side). However, it has been found that workability deteriorates in the production of a polarizing plate by cutting the optical laminate, and thus a new problem occurs such as the occurrence of cracks between the masking layer and a layer adjacent to the masking layer in the produced polarizing plate.

Accordingly, an object of the invention is to provide an optical laminate which has excellent workability in the production of a polarizing plate and is capable of suppressing the occurrence of cracks in the polarizing plate, a polarizing plate, a method of manufacturing the polarizing plate using the optical laminate, and an image display device having the polarizing plate.

The inventors have conducted intensive studies in order to achieve the object, and found that regarding an optical laminate having a polarizer, an optical anisotropic layer, and a masking layer in this order, in a case where hardness HB of the masking layer is half to two times hardness HA of a layer adjacent to the optical anisotropic layer side of the masking layer, workability in the production of a polarizing plate is improved and the occurrence of cracks in the polarizing plate can be suppressed, whereby the inventors completes the invention.

That is, the inventors have found that the object can be achieved with the following configuration.

[1] An optical laminate comprising in order: a polarizer; an optical anisotropic layer; and a masking layer, in which hardness HB of the masking layer and hardness HA of a layer adjacent to the optical anisotropic layer side of the masking layer satisfy Expression (1).

$$HA \times 0.5 \leq HB \leq HA \times 2 \quad (1)$$

[2] A polarizing plate comprising in order: a polarizer; an optical anisotropic layer; and a masking layer, in which the masking layer is provided in a peripheral portion of a layer adjacent to the optical anisotropic layer side of the masking layer, and hardness HB of the masking layer and hardness HA of the layer adjacent to the optical anisotropic layer side of the masking layer satisfy Expression (1).

$$HA \times 0.5 \leq HB \leq HA \times 2 \quad (1)$$

[3] A method of manufacturing a polarizing plate to produce the polarizing plate according to [2], comprising: a cutting step of cutting the optical laminate according to [1] in a thickness direction to produce the polarizing plate.

[4] The method of manufacturing a polarizing plate according to [3], further comprising: a patterning step of removing a part of the masking layer in a portion which is not cut in the cutting step before or after the cutting step.

[5] An image display device comprising: the polarizing plate according to [2]; and a display element.

[6] An image display device comprising: a liquid crystal cell; and a pair of polarizing plates between which the liquid crystal cell is interposed, in which at least one of the pair of polarizing plates which is disposed on the visible side is the polarizing plate according to [2].

According to the invention, it is possible to provide an optical laminate which has excellent workability in the production of a polarizing plate and is capable of suppressing the occurrence of cracks in the polarizing plate, a polarizing plate, a method of manufacturing the polarizing plate using the optical laminate, and an image display device having the polarizing plate.

DESCRIPTION OF THE PREFERRED EMBODIMENTS

Figure 1A:
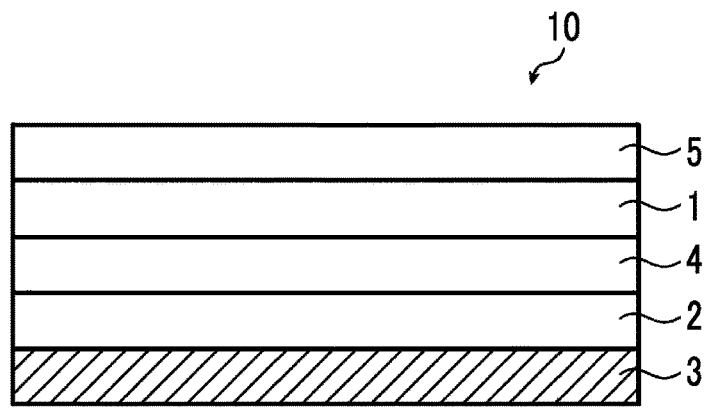
FIG. 1A is a cross-sectional view schematically illustrating an embodiment of an optical laminate according to the invention.

Hereinafter, the invention will be described in detail.

The following description of constituent requirements is based on typical embodiments of the invention, but the invention is not limited thereto.

In this specification, a numerical value range expressed using "to" means a range including numerical values before and after "to" as a lower limit value and an upper limit value.

Regarding the angle, each of "perpendicular" and "parallel" means a range of strict angle±10°, and regarding the angle, "the same" and "different" can be determined based on whether the angular difference is less than 5° or not.

In this specification, "visible light" is light ranging from 380 to 780 nm. In this specification, the measurement wavelength is 550 nm in a case where there are no particular additional notes in regard to the measurement wavelength.

Next, terms which are used in this specification will be described.

<Slow Axis>

In this specification, a "slow axis" means a direction in which a refractive index is maximized in a plane. A slow axis of an optical anisotropic layer means a slow axis of the entire optical anisotropic layer.

<Re (λ), Rth (λ)>

In this specification, "Re (λ)" and "Rth (λ)" represent in-plane retardation and retardation in a thickness direction, respectively, at a wavelength λ.

Re (λ) is measured by making light having a wavelength of λ nm incident in a normal direction of a film by KOBRA 21ADH or KOBRA WR (all manufactured by Oji Scientific Instruments). In the selection of the measurement wavelength λ nm, a wavelength selective filter can be manually exchanged or the measurement value can be exchanged by the program to perform the measurement.

Herein, in a case where a film to be measured is expressed as a uniaxial or biaxial index ellipsoid, Rth (λ) is calculated through the following method.

Rth (λ) is calculated by KOBRA 21ADH or KOBRA WR based on Re(λ) values which are retardation values measured at a total of six points by making light having a wavelength of k nm incident in directions tilted up to 50 degrees toward a single side at 10 degree intervals with respect to the normal direction of the film, using an in-plane slow axis (determined by KOBRA 21ADH or KOBRA WR) as a tilt axis (rotational axis) (in a case where there is no slow axis, an arbitrary direction in the film plane is used as the rotational axis), an assumed average refractive index, and a value input as a film thickness.

In the above description, in a case of a film having a direction in which the retardation value reaches zero at a certain tilt angle from the normal direction using the in-plane slow axis as a rotational axis, the retardation value at a tilt angle larger than the above-described tilt angle is changed into a negative value, and then calculated by KOBRA 21ADH car KOBRA WR.

Meanwhile, Rth can also be calculated as follows: retardation values are measured in two arbitrary tilt directions using the slow axis as a tilt axis (rotational axis) (in a case where there is no slow axis, an arbitrary direction in the film plane is used as the rotational axis), and Rth is calculated based on the above-described values, an assumed average refractive index, and a value input as a film thickness using Expressions (1) and (2).

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Expression (1)

$$Rth = \left[\frac{nx + ny}{2} - nz\right] \times d$$

Expression (2)

In the expressions, Re (θ) represents a retardation value in a direction tilted at an angle θ from the normal direction. nx represents a refractive index in a slow axis direction in the plane, ny represents a refractive index in a direction perpendicular to nx in the plane, and nz represents a refractive index in a direction perpendicular to nx and ny. d represents a film thickness.

In a case where a film to be measured cannot be expressed as a uniaxial or biaxial index ellipsoid, that is, does not have a so-called optic axis, Rth (λ) is calculated through the following method.

Rth (λ) is calculated by KOBRA 21ADH or KOBRA WR based on Re(λ) values which are retardation values measured at a total of eleven points by making light having a wavelength of λ nm incident in directions tilted from −50 degrees to +50 degrees at 10 degree intervals with respect to the normal direction of the film, using an in-plane slow axis (determined by KOBRA 21ADH or KOBRA WR) as a tilt axis (rotational axis), an assumed average refractive index, and a value input as a film thickness.

In the above measurement, as the assumed average refractive index, values from a polymer handbook (JOHN WILEY & SONS, INC) and a variety of optical film catalogues can be used. For optical films having unknown average refractive index values, the refractive index values can be measured using an Abbe refractometer. The average refractive index values of major optical films will be described below: cellulose acylate (1.48), cycloolefin polymer (1.52), polycarbonate (1.59), polymethyl methacrylate (1.49), and polystyrene (1.59). By inputting these assumed average refractive index values and the film thickness, KOBRA 21ADH or KOBRA WR calculates nx, ny, and nz. With the calculated nx, ny, and nz, Nz=(nx−nz)/(nx−ny) is further calculated.

[Optical Laminate]

An optical laminate according to the invention has a polarizer, an optical anisotropic layer, and a masking layer in this order.

In the optical laminate according to the invention, hardness HB of the masking layer and hardness HA of a layer adjacent to the optical anisotropic layer side of the masking layer (hereinafter, may be simply abbreviated as "adjacent layer") satisfy Expression (1).

$$HA \times 0.5 \leq HB \leq HA \times 2 \qquad (1)$$

Here, regarding the "layer adjacent to the optical anisotropic layer side of the masking layer" (adjacent layer), for example, in a case where an arbitrary polymer film is provided between the masking layer and the optical anisotropic layer, and the masking layer and the polymer film are adjacent to each other, the adjacent layer is the polymer film, and in a case where the masking layer and the optical anisotropic layer are adjacent to each other, the adjacent layer is the optical anisotropic layer.

As both the hardness HB of the masking layer and the hardness HA of the adjacent layer, Martens hardness values obtained by a nano-indentation method according to ISO 1457 are used. More specifically, using a microhardness tester (e.g., DUH-211 of Shimadzu Corporation or HM2000 of FISCHER INSTRUMENTS K.K.) provided with a Berkovich indenter, the indenter is pushed against a cross-section obtained by cutting a measurement target layer by a microtome at a pushing speed of 10 mN/min until the maximum test force of 20 mN is reached, and based on a value of the maximum pushing depth in a case where unloading is conducted after holding for a certain period of time, a value is obtained from the following expression and used.

$$HM = F/(26.43 \times h^2)$$

In the expression, HM represents Martens hardness (unit: N/mm$^2$), F represents the maximum test force (unit: N), and h represents a pushing depth (unit: mm).

In the invention, in a case where the hardness HB of the masking layer and the hardness HA of the adjacent layer satisfy Expression (1), excellent workability is obtained in the production of a polarizing plate, and the occurrence of cracks in the polarizing plate can be suppressed.

The detailed reason for this is not clear, but the inventors presume the reason to be as follows.

That is, the reason is thought to be that since the difference between the hardness HB of the masking layer and the hardness HA of the adjacent layer is small, stress is not concentrated on any one layer, but appropriately distributed during the cutting step for producing a polarizing plate, and it is possible to gently absorb the stress.

In the invention, the hardness HB of the masking layer and the hardness HA of the adjacent layer preferably satisfy Expression (2) since the workability in the production of a polarizing plate is further improved.

$$HA \times 0.75 \leq HB \leq HA \times 1.4 \qquad (2)$$

Next, an overall configuration of the optical laminate according to the invention will be described using FIGS. 1A and 1B, and then configurations of the respective portions will be described in detail.

Figure 1B:
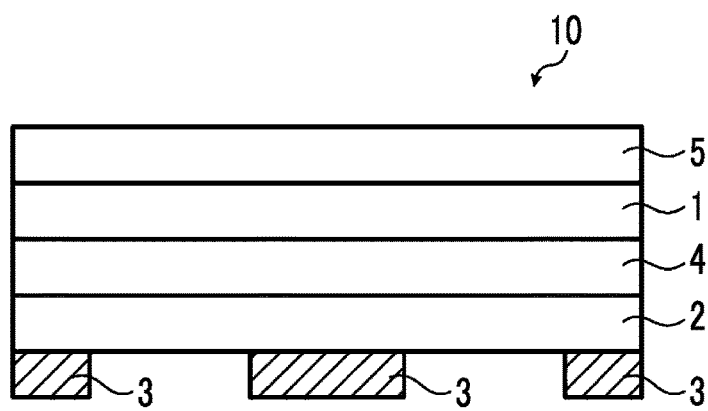
FIG. 1B is a cross-sectional view schematically illustrating another embodiment of the optical laminate according to the invention.

Each of FIGS. 1A and 1B is a cross-sectional view schematically illustrating an embodiment of the optical laminate according to the invention.

As illustrated in FIGS. 1A and 1B, an optical laminate 10 has a polarizer 1, an optical anisotropic layer 2, and a masking layer 3 in this order.

As illustrated in FIGS. 1A and 1B, an arbitrary polymer film 4 may be provided between the polarizer 1 and the optical anisotropic layer 2, and an arbitrary polymer film 5 may be provided on a surface of the polarizer 1 on the side opposite to the polymer film 4.

The optical laminate according to the invention may have an arbitrary polymer film (not shown) between the optical anisotropic layer 2 and the masking layer 3 illustrated in FIGS. 1A and 1B, or an arbitrary hard coat layer (not shown) on a surface of the polymer film 5 on the side opposite to the polarizer 1.

In die optical laminate according to the invention, the masking layer 3 may be provided on the entire surface of the adjacent layer (in FIG. 1A, optical laminate 2) as illustrated in FIG. 1A, or the masking layer 3 may be provided on a part of the optical laminate 2 as illustrated in FIG. 1B.

[Polarizer]

A polarizer which is used in the invention is not particularly limited, and a conventionally known polarizer can be appropriately employed and used.

Examples of the polarizer include a film obtained by uniaxially stretching a hydrophilic polymer film such as a polyvinyl alcohol-based film, a partially formalized polyvinyl alcohol-based film, or an ethylene-vinyl acetate copolymer-based, partially saponified film after adsorption of a dichroic substance such as iodine or a dichroic dye to the hydrophilic polymer film; and a polyene-based alignment film such as a dehydrate of polyvinyl alcohol or a dehydrochlorinate of polyvinyl chloride.

Among these, a polarizer formed of a polyvinyl alcohol-based film and a dichroic substance such as iodine is suitable.

The thickness of the polarizer is not particularly limited. The thickness is preferably 25 µtri or less, and more preferably 15 µm or less since the thickness of a polarizing plate can be reduced. The lower limit is not particularly limited, and generally 1 µm or greater.

[Optical Anisotropic Layer]

An optical anisotropic layer which is used in the invention is not particularly limited, and a conventionally known optical anisotropic layer can be appropriately used.

In the invention, the optical anisotropic layer preferably includes a liquid crystal compound. The optical anisotropic layer may have a single layer structure or a lamination structure.

<Liquid Crystal Compound>

In general, liquid crystal compounds can be classified into a rod-like type and a disk-like type according to the shape thereof. Further, each type includes a low molecular type and a high molecular type. The term high molecular generally refers to a compound having a degree of polymerization of 100 or greater (Polymer Physics-Phase Transition Dynamics, written by Masao Doi, p. 2, published by Iwanami Shoten, 1992). In the invention, any type of liquid crystal compound can be used, but a rod-like liquid crystal compound or a discotic liquid crystal compound (disk-like liquid crystal compound) is preferably used. Two or more types of rod-like liquid crystal compounds, two or more types of disk-like liquid crystal compounds, or a mixture of a rod-like liquid crystal compound and a disk-like liquid crystal compound may be used. In order to fix the above-described liquid crystal compound, a rod-like liquid crystal compound or disk-like liquid crystal compound having a polymerizable group is more preferably used, and the liquid crystal compound even more preferably has two or more polymerizable groups in one molecule. In a case of a mixture of two or more types of liquid crystal compounds, at least one type of liquid crystal compound preferably has two or more polymerizable groups in one molecule.

As the rod-like liquid crystal compound, for example, those described in claim 1 of JP1999-513019A (JP-H11-513019A) or paragraphs [0026] to [0098] of JP2005-289980A can be preferably used, and as the discotic liquid crystal compound, for example, those described in paragraphs [0020] to [0067] of JP2007-108732A or paragraphs [0013] to [0108] of JP2010-244038A can be preferably used, but the liquid crystal compounds are not limited thereto.

In the invention, the optical anisotropic layer in the optical laminate preferably satisfies Expression (I) from the viewpoint that a polarizing plate according to the invention to be described later is allowed to function as a circularly polarizing plate.

$$100 \leq Re(550) \leq 180 \text{ nm} \quad (1)$$

Here, in Expression (I), Re (550) represents in-plane retardation of the optical anisotropic layer at a wavelength of 550 nm.

In this specification, the "circularly polarizing plate" is used to mean both of a long circularly polarizing plate and a circularly polarizing plate cut into a size that fits in a display device unless specifically noted. The term "cut" mentioned herein includes "punching" and "cutting".

In the invention, the optical anisotropic layer is preferably a laminate having a λ/2 plate and a λ/4 plate since the optical anisotropic layer functions as a λ/4 plate in a wide wavelength range and can be more suitably used as a circularly polarizing plate.

<λ/2 Plate>

A λ/2 plate refers to an optical anisotropic layer in which in-plane retardation Re (λ) at a specific wavelength of λ nm satisfies Re (λ)=λ/2. The above expression may be satisfied at one (e.g., 550 nm) of wavelengths of a visible light region.

In the invention, in-plane retardation Re (550) of the λ/2 plate at a wavelength of 550 nm is preferably 205 to 275 nm, and more preferably 215 to 265 nm.

Rth (550) that is a retardation value in a thickness direction of the λ/2 plate measured at a wavelength of 550 nm is preferably −240 to 240 nm, and more preferably −160 to 160 nm in view of more excellent effects of the invention.

The thickness of the λ/2 plate is not particularly limited, and preferably 0.5 to 10 μm, and more preferably 0.5 to 5 μm since the thickness of a display device can be easily reduced.

The thickness means an average thickness. It is obtained by arithmetically averaging thicknesses measured at arbitrary five points of the λ/2 plate.

The λ/2 plate is more preferably formed using a liquid crystal compound (rod-like liquid crystal compound or disk-like liquid crystal compound) having a polymerizable group since a change of optical characteristics due to the temperature or humidity can be reduced. The liquid crystal compound may be a mixture of two or more types, and in that case, at least one type preferably has two or more polymerizable groups.

That is, the λ/2 plate is preferably a layer formed by fixing a rod-like liquid crystal compound having a polymerizable group or a disk-like liquid crystal compound having a polymerizable group by polymerization, and in that case, after the formation of the layer, it is not necessary for the layer to exhibit crystallinity.

The type of the polymerizable group included in a rod-like liquid crystal compound or a disk-like liquid crystal compound is not particularly limited. A functional group allowing an addition polymerization reaction is preferable, and a polymerizable ethylenically unsaturated group or a cyclic polymerizable group is preferable. More specifically, preferable examples thereof include a (meth)acryloyl group, a vinyl group, a styryl group, and an allyl group, and a (meth)acryloyl group is more preferable. A (meth)acryloyl group means both of a methacryloyl group and an acryloyl group.

<λ/4 Plate>

A λ/4 plate is a plate functioning to convert linearly polarized light having a certain wavelength into circularly polarized light (or to convert circularly polarized light into linearly polarized light), and refers to an optical anisotropic layer in which in-plane retardation Re (λ) at a certain wavelength of λ nm satisfies Re (λ)=λ/4. The above expression may be satisfied at one (e.g., 550 nm) of wavelengths of a visible light region.

In the invention, in-plane retardation Re (550) of the λ/4 plate at a wavelength of 550 nm is preferably 100 to 150 nm, and more preferably 110 to 140 nm.

Rth (550) that is a retardation value in a thickness direction of the λ/4 plate measured at a wavelength of 550 nm is preferably −120 to 120 nm, and more preferably −80 to 80 nm in view of more excellent effects of the invention.

The thickness of the λ/4 plate is not particularly limited, and preferably 0.5 to 10 μm, and more preferably 0.5 to 5 μm since the thickness of a display device can be easily reduced.

The thickness means an average thickness. It is obtained by arithmetically averaging thicknesses measured at arbitrary five points of the λ/4 plate.

The λ/4 plate is preferably a layer formed by fixing a liquid crystal compound (rod-like liquid crystal compound or a disk-like liquid crystal compound) having a polymerizable group by polymerization, and in that case, after the formation of the layer, it is not necessary for the layer to exhibit crystallinity.

In the invention, in a case where a laminate having the λ/2 plate and the λ/4 plate which have been described above is used as an optical anisotropic layer, a circularly polarizing plate preferably has the above-described polarizer, a transparent support, the λ/2 plate, and the λ/4 plate in this order to function as a circularly polarizing plate in a wide wavelength range. In addition, an angle formed between an in-plane slow axis of the λ/4 plate and an in-plane slow axis of λ/2 plate is preferably 60°.

The method of forming the above-described λ/2 plate or λ/4 plate is not particularly limited, and examples thereof include known methods.

For example, a coating film may be formed by coating a predetermined substrate (including any one of temporary substrate, λ/2 plate, and λ/4 plate) with an optical anisotropic layer forming composition (hereinafter, may be simply referred to as "composition") containing a liquid crystal compound having a polymerizable group, and the obtained coating film may be cured (irradiation with ultraviolet rays (light irradiation treatment) or heating treatment) for manufacturing. If necessary, an alignment film to be described later may be used.

Coating with the composition can be performed by a known method (e.g., wire bar coating method, extrusion coating method, direct gravure coating method, reverse gravure coating method, or die coating method).

The composition may contain a component other than the above-described liquid crystal compound.

For example, the composition may contain a polymerization initiator. A polymerization initiator to be used is selected in accordance with the form of the polymerization reaction, and examples thereof include a thermal polymerization initiator and a photopolymerization initiator. Examples of the photopolymerization initiator include α-carbonyl compound, acyloin ether, α-hydrocarbon-substituted aromatic acyloin compound, polynuclear quinone compound, and combination of triaryl imidazole dimer and p-aminophenyl ketone.

The amount of the polymerization initiator to be used is preferably 0.01 to 20 mass %, and more preferably 0.5 to 5 mass % with respect to the total solid content of the composition.

The composition may contain a polymerizable monomer in view of the uniformity of the coating film and the hardness of the film.

Examples of the polymerizable monomer include a radical polymerizable or cation polymerizable compound. A polyfunctional radical polymerizable monomer is preferable, and the polymerizable monomer is preferably copolymerizable with the above-described liquid crystal compound containing a polymerizable group. Examples thereof include those described in paragraphs [0018] to [0020] of JP2002-296423A.

The amount of the polymerizable monomer to be added is preferably 1 to 50 mass %, and more preferably 2 to 30 mass % with respect to the total mass of the liquid crystal compound.

The composition may contain a surfactant in view of the uniformity of the coating film and the hardness of the film. Examples of the surfactant include conventional known compounds, and a fluorine-based compound is preferable. Specific examples thereof include compounds described in paragraphs [0028] to [0056] of JP2001-330725A and compounds described in paragraphs [0069] to [0126] of JP2003-295212.

The composition may contain a solvent. An organic solvent is preferably used.

As the organic solvent, for example, an alcohol-based solvent or a ketone-based solvent is preferably used.

Specific examples thereof include acetone, methyl ethyl ketone, 2-pentanone, 3-pentanone, 2-hexane, 2-heptanone, 4-heptanone, methyl isopropyl ketone, ethyl isopropyl ketone, diisopropyl ketone, methyl isobutyl ketone, methyl-t-butyl ketone, diacetyl, acetylacetone, acetonylacetone, diacetone alcohol, mesityl oxide, chloroacetone, cyclopentanone, cyclohexanone and acetophenone. Among these, methyl ethyl ketone and methyl isobutyl ketone are preferable. These solvents may be used alone or as a mixture of at least two kinds thereof mixed at an arbitrary mixing ratio.

The composition may contain various alignment agents such as vertical alignment accelerators, e.g., polarizer interface-side vertical alignment agents and air interface-side vertical alignment agents, and horizontal alignment accelerators, e.g., polarizer interface-side horizontal alignment agents and air interface-side horizontal alignment agents.

The composition may further contain an adhesion enhancing agent, a plasticizer, a polymer, or the like other than the above-described components.

In the invention, the thickness of the optical anisotropic layer (in a case where the layer has the λ/2 plate and the λ/4 plate which have been described above, total thickness thereof) is not particularly limited. The thickness is preferably 0.1 to 10 μm, and more preferably 0.5 to 5 μm.

[Masking Layer]

A masking layer which is used in the invention is not particularly limited as long as the hardness HB of the masking layer and the hardness HA of the adjacent layer satisfy Expression (1), and a conventionally known masking layer can be appropriately employed and used.

$$HA \times 0.5 \leq HB \leq HA \times 2 \quad (1)$$

The masking layer preferably contains a colorant.

As the colorant, a known colorant (organic pigment, inorganic pigment, dye, or like) can be suitably used.

In a case where the masking layer is black, the masking layer preferably contains a black colorant.

Examples of the black colorant include carbon black, titanium carbon, iron oxide, titanium oxide, and black lead. Among these, carbon black is preferable. Other than the black colorant, a mixture of pigments such as red, blue, and green can be used.

In a case where the masking layer is white, the masking layer preferably contains a white colorant.

As the white colorant, white pigments described in paragraph 0019 of JP2009-191118A or paragraph 0109 of JP2000-175718A can be used. White pigments described in paragraph 0015 or 0114 of JP2005-7765A can also be used.

Specifically, in the invention, a white inorganic pigment such as titanium oxide (rutile type), titanium oxide (anatase type), zinc oxide, lithophone, light calcium carbonate, white carbon, aluminum oxide, aluminum hydroxide, or barium sulfate is preferable, titanium oxide (rutile type), titanium oxide (anatase type), or zinc oxide is more preferable, titanium oxide (rutile type) or titanium oxide (anatase type) is even more preferable, and rutile-type titanium oxide is particularly preferable.

It is desirable that the colorant is used as a dispersion liquid.

The dispersion liquid can be prepared by adding and dispersing a composition obtained by previously mixing the colorant and a pigment dispersing agent in an organic solvent (or vehicle).

Here, the vehicle refers to a medium part which disperses the pigment in a case where the paint is in a liquid state, and includes a component (binder) which is in a liquid state and forms a coating film by bonding to the pigment and a component (organic solvent) which dissolves and dilutes the above component.

The dispersing machine which is used in the dispersion of the pigment is not particularly limited, and examples thereof include known dispersing machines such as a kneader, a roll mill, an attritor, a super mill, a dissolver, a homomixer, and a sand mill described in "Pigment Dictionary", written by kunizo Asakura, First Edition, Asakura Publishing Co., Ltd., 2000, p. 438. A frictional force may be used for pulverizing through mechanical grinding described in p. 310 of "Pigment Dictionary".

The number average particle diameter of the colorant is preferably 0.001 μm to 0.1 μm, and more preferably 0.01 μm to 0.08 μm from the viewpoint of dispersion stability.

Here, the "particle diameter" refers to a diameter in a case where an electron microscopic image of a particle is a circle having the same area, and the "number average particle diameter" refers to an average of particle diameters of arbitrary 100 particles.

<Resin Composition>

The masking layer is preferably formed using a resin composition containing a resin (binder), a polymerizable compound, and a polymerization initiator with the above-described colorant.

Here, as the resin material, an alkali-soluble resin is preferable, and specifically, polymers described in paragraph [0025] of JP2011-95716A or paragraphs [0033] to [0052] of JP2010-237589A can be suitably used.

As the polymerizable compound, polymerizable compounds described in paragraphs [0023] and [0024] of JP4098550B can be used.

As the polymerization initiator or the polymerization initiating system, polymerizable compounds described in [0031] to [0042] of JP2011-95716A can be used.

The resin composition may further contain an additive. Examples of the additive include surfactants described in paragraph [0017] of JP4502784B or paragraphs [0060] to [0071] of JP2009-237362A; thermal polymerization initiators described in paragraph [0018] of JP4502784B; and other additives described in paragraphs [0058] to [0071] of JP2000-310706A.

In order to produce the masking layer by coating, the resin composition may contain a solvent, and as the solvent, solvents described in paragraphs [0043] and [0044] of JP2011-95716A can be used.

<Method of Forming Masking Layer>

The method of forming a masking layer is not particularly limited, and the masking layer is preferably formed using a transfer film which has a temporary support and a resin layer formed using the above-described resin composition in this order. Specifically, the masking layer is more preferably formed using a photosensitive transfer film which has a temporary support and a photocurable resin layer in this order, and particularly preferably formed using a photosensitive transfer film which has a temporary support, a thermoplastic resin layer, and a photocurable resin layer in this order.

In a case where the masking layer is formed using a transfer film, a colorant can be used in a resin layer. As the colorant, the above-described colorants can be suitably used.

In a case where a transfer film is used and the masking layer includes a photocurable resin, patterning can be performed by a general photolithography method.

In the invention, the thickness of the masking layer is preferably 0.5 to 10 µm, and more preferably 0.8 to 5 µm, and even more preferably 1 to 3 µm since the thickness of a display device is easily reduced.

[Polymer Film]

The arbitrary polymer film which is used in the invention is not particularly limited, and it is possible to use a polymer film (e.g., polarizer protective film) which is generally used.

Specific examples of the polymer constituting the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyimide; inside-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

Among these, cellulose-based polymers (hereinafter, may be referred to as "cellulose acylate"), represented by triacetyl cellulose, can be preferably used.

From the viewpoint of workability and optical performance, acrylic polymers are also preferably used.

Examples of the acrylic polymers include polymethyl methacrylate and lactone ring-containing polymers described in paragraphs [0017] to [0107] of JP2009-98605A.

The thickness of the polymer film is not particularly limited, and preferably 40 µm or less since the thickness of the polarizing plate can be reduced. The lower limit is not particularly limited, and generally 5 µm or greater.

[Hard Coat Layer]

The optical laminate according to the invention may have, for example, a hard coat layer as an outermost layer on the visible side.

As the material of the hard coat layer which is used in the invention, it is possible to use a hard coat layer material which is generally used.

In addition, the hard coat layer is preferably formed by a crosslinking reaction or a polymerization reaction of an ionizing radiation-curable compound.

For example, the hard coat layer can be formed by coating a protective layer to be described later with a coating composition containing an ionizing radiation-curable polyfunctional monomer or polyfunctional oligomer and by crosslinking or polymerizing the polyfunctional monomer or polyfunctional oligomer.

As the functional group of the ionizing radiation-curable polyfunctional monomer or polyfunctional oligomer, a photopolymerizable functional group, an electron radiation polymerizable functional group, or a radiation polymerizable functional group is preferable, and among these, a photopolymerizable functional group is preferable.

Examples of the photopolymerizable functional group include unsaturated polymerizable functional groups such as a (meth)acryloyl group, a vinyl group, a styryl group, and an allyl group, and among these, a (meth)acryloyl group is preferable.

In order to impart an internal scattering property, the hard coat layer may contain mat particles having an average particle diameter of 1.0 µm to 10.0 µm, and preferably 1.5 to 7.0 µm, e.g., particles of an inorganic compound or a resin.

The arbitrary hard coat layer which is used in the invention can be produced with a producing method which is generally used. The hard coat layer may be produced by direct coating on the above-described polarizer or polymer film, or by producing and transferring a hard coat layer on a separate base material.

[Pressure Sensitive Adhesive Layer or Adhesive Layer]

In the optical laminate according to the invention, a pressure sensitive adhesive or an adhesive may be used for, for example, lamination of the above-described polarizer.

As the pressure sensitive adhesive or the adhesive, it is possible to use a pressure sensitive adhesive (e.g., acrylic pressure sensitive adhesive) or an adhesive (e.g., ultraviolet-curable adhesive, polyvinyl alcohol-based adhesive, or the like) which is generally used.

Examples of the pressure sensitive adhesive or the adhesive which can be used in the invention include pressure sensitive adhesives described in paragraphs [0100] to [0115] of JP2011-037140A or paragraphs [0155] to [0171] of JP2009-292870A.

[Alignment Film]

The optical laminate according to the invention preferably has an alignment film in a case where the optical laminate contains a liquid crystal compound as an optical anisotropic layer.

The alignment film is a layer functioning to specify the alignment direction of liquid crystal compound, and generally contains a polymer as a main component.

Regarding a polymer material for an alignment film, there are descriptions in many literatures, and many commercially available products are available. As a polymer material to be used, polyvinyl alcohols, polyimides, and derivatives thereof are preferable. Particularly, modified or unmodified polyvinyl alcohols are preferable. Regarding the alignment film which can be used in the invention, modified polyvinyl alcohols described in Line 24 of p. 43 to Line 8 of p. 49 of WO01/88574A1 or paragraphs [0071] to [0095] of JP3907735B can be referred to. In general, the alignment film is subjected to a known rubbing treatment. That is, in general, the alignment film is preferably a rubbed alignment film subjected to a rubbing treatment.

[Polarizing Plate]

A polarizing plate according to the invention is a polarizing plate which has a polarizer, an optical anisotropic layer, and a masking layer in this order, and in which the masking layer is provided in a peripheral portion of a layer adjacent to the optical anisotropic layer side of the masking layer (adjacent layer).

In addition, the polarizing plate according to the invention is a polarizing plate in which hardness HB of the masking layer and hardness HA of the adjacent layer satisfy Expression (1) as in the case of the optical anisotropic layer according to the invention.

$$HA \times 0.5 \leq HB \leq HA \times 2 \quad (1)$$

Here, the width of the "peripheral portion" in which the adjacent layer is provided is not particularly limited since it depends on the sizes or the like of a gate driver and a source driver disposed in an image display device. The width is preferably about 1/5 to 1/100 of a length of a side of the adjacent layer (long side in a case where the adjacent layer has a rectangular shape). The width of the peripheral portion may be the same in all of the sides, or may vary in some or all of the sides.

Next, an overall configuration of the polarizing plate according to the invention will be described using FIG. 2.

Figure 2:
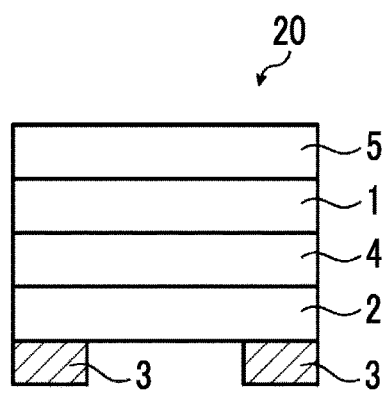
FIG. 2 is a cross-sectional view schematically illustrating an embodiment of a polarizing plate according to the invention.

FIG. 2 is a cross-sectional view schematically illustrating an embodiment of the polarizing plate according to the invention.

As illustrated in FIG. 2, a polarizing plate 20 has a polarizer 1, an optical anisotropic layer 2, and a masking layer 3 in this order.

In addition, as illustrated in FIG. 2, an arbitrary polymer film 4 may be provided between the polarizer 1 and the optical anisotropic layer 2, and an arbitrary polymer film 5 may be provided on a surface of the polarizer 1 on the side opposite to the polymer film 4.

Here, the polarizer, the optical anisotropic layer, and the masking layer of the polarizing plate according to the invention are the same as the above-described optical laminate according to the invention, except that the masking layer is provided in a peripheral portion of an adjacent layer.

The polarizing plate according to the invention may have the polymer film, the hard coat layer, the pressure sensitive adhesive layer or adhesive layer, and the alignment film which have been described in the optical laminate according to the invention.

As described above, the optical laminate according to the invention also includes an aspect in which the masking layer is formed only in a part of the adjacent layer (e.g., see FIG. 1B). Accordingly, the polarizing plate according to the invention may be an aspect of the optical laminate according to the invention.

[Method of Manufacturing Polarizing Plate]

The method of manufacturing a polarizing plate according to the invention has a cutting step of cutting the above-described optical laminate according to the invention in a thickness direction to produce a polarizing plate.

The method of manufacturing a polarizing plate according to the invention preferably has a patterning step of removing a part of the masking layer in a portion which is not cut in the cutting step before or after the cutting step.

Next, the respective steps of the method of manufacturing a polarizing plate according to the invention will be described using FIGS. 3 and 4.

[Cutting Step]

The cutting step is a step of cutting the above-described optical laminate according to the invention in a thickness direction.

Figure 3:
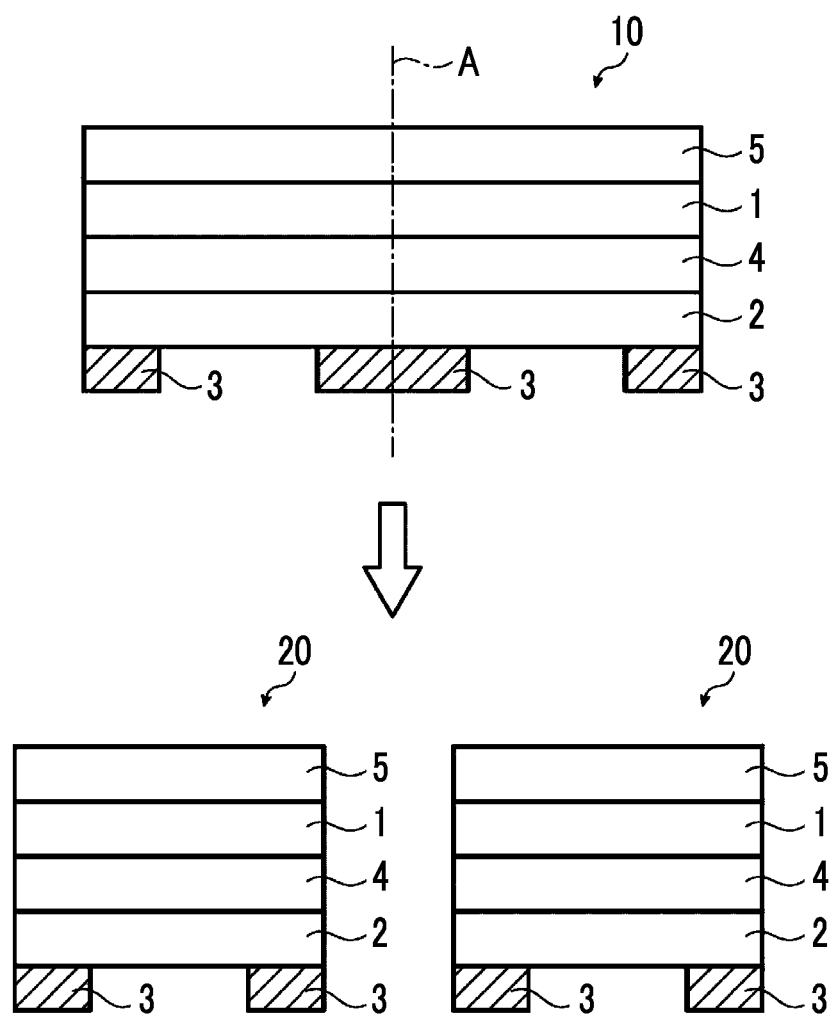
FIG. 3 is a schematic diagram explaining a method of manufacturing a polarizing plate using the optical laminate of FIG. 1B (cutting step).

Specifically, the cutting step is a step of performing cutting of the optical laminate 10 illustrated in FIG. 1B at a position shown by the dot-and-dash line A as illustrated in FIG. 3 to produce a polarizing plate 20.

Here, the method of cutting the optical laminate in the thickness direction is not particularly limited, and examples thereof include a cutting method using a rotary circular cutter described in JP2007-260865A or JP2008-63059A; a cutting method using a travelling blade such as a cutting plotter; a Thomson blade-type or Pinnacle blade-type punching method using a die cut roll; and a method of performing cutting-off up to a desired size using a rotary body provided with a cutting blade as described in JP2012-203209A. In this case, a plurality of optical laminates may be simultaneously cut from the viewpoint of work efficiency.

The manufacturing method according to the invention may have a step of smoothing an end face of the cut optical laminate after the cutting step.

[Patterning Step]

The patterning step is an arbitrary step of removing a part of the masking layer in a portion which is not cut in the cutting step before or after the cutting step.

Figure 4:
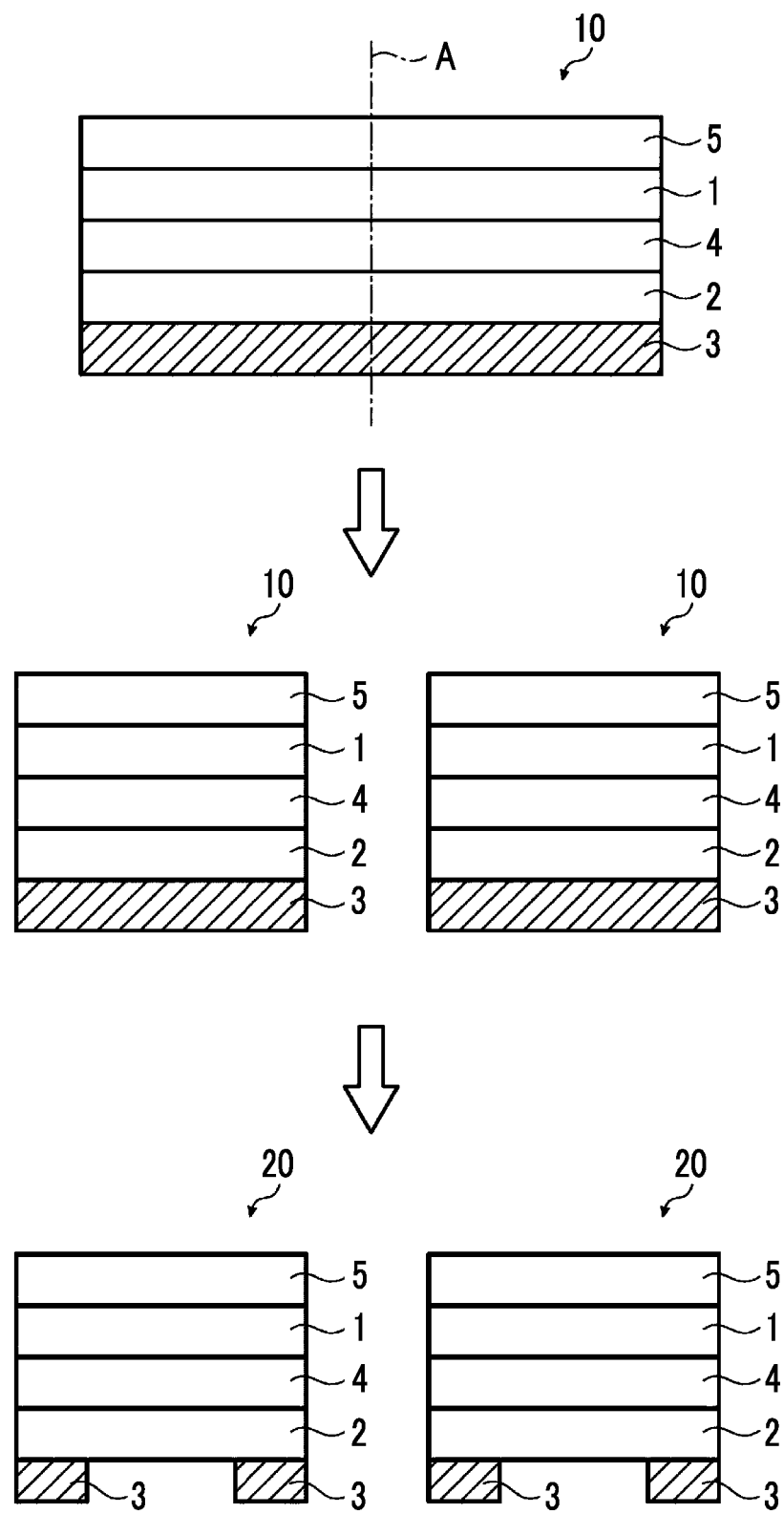
FIG. 4 is a schematic diagram explaining a method of manufacturing a polarizing plate using the optical anisotropic layer of FIG. 1A (cutting step and patterning step).

Specifically, the patterning step is a step of producing a polarizing plate 20 by removing a part of the masking layer 3 after cutting at a position shown by the dot-and-dash line A using the optical laminate 10 illustrated in FIG. 1A as illustrated in FIG. 4.

FIG. 3 illustrates an aspect in which an optical laminate in which a part of the masking layer 3 is removed by patterning before the cutting step is used.

Here, examples of the method of removing a part of the masking layer include a method of performing patterning by a general photolithography method using a photosensitive transfer film having a thermoplastic resin layer and a photocurable resin layer as the masking layer as described above. Specifically, exposure may be performed according to a required pattern, and then in a case of a negative material, a non-exposed portion may be removed, and in a case of a positive material, an exposed portion may be removed by a development treatment to obtain a pattern. In this case, in the development, the thermoplastic resin layer and the photocurable resin layer may be removed by development by different liquids, or removed by the same liquid. If necessary, known developing equipment may be combined such as a brush or a high-pressure jet. After the development, post-exposure or post-baking may be performed if necessary.

[Image Display Device]

An image display device according to the invention has the above-described polarizing plate according to the invention and a display element.

Next, an overall configuration of the image display device according to the invention will be described using FIG. 5, and then configurations of the respective portions will be described in detail.

Figure 5:
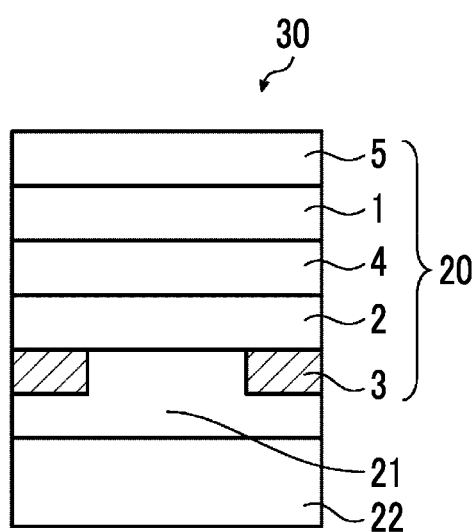
FIG. 5 is a cross-sectional view schematically illustrating an embodiment of an image display device according to the invention.

FIG. 5 is a cross-sectional view schematically illustrating an embodiment of the image display device according to the invention.

As illustrated in FIG. 5, an image display device 30 has a polarizing plate 20 and a display element 22.

In addition, as illustrated in FIG. 5, an arbitrary pressure sensitive adhesive layer 21 may be provided between the polarizing plate 20 and the display element 22.

[Display Element]

The display element of the image display device according to the invention is not particularly limited, and examples thereof include a liquid crystal panel, an organic electroluminescence (EL) display panel, and a plasma display panel.

Among these, the display element is preferably a liquid crystal panel or an organic EL display panel. That is, the image display device according to the invention is preferably a liquid crystal display device using a liquid crystal panel as a display element or an organic EL display device using an organic EL display panel as a display element.

[Liquid Crystal Display Device]

Examples of the liquid crystal display device which is an example of the image display device according to the invention include a liquid crystal display device which has a liquid crystal panel having a liquid crystal cell and a pair of polarizing plates between which the liquid crystal panel is interposed, and in which at least one of the pair of polarizing plates which is disposed on the visible side is composed of the above-described polarizing plate according to the invention.

<Liquid Crystal Cell>

The liquid crystal cell which is used in the image display device (liquid crystal display device) according to the invention is preferably a vertical alignment (VA) mode, an optically compensated bend (OCB) mode, an in-plane-switching (IPS) mode, or a twisted nematic (TN) mode, but is not limited thereto.

In a TN mode liquid crystal cell, rod-like liquid crystalline molecules are substantially horizontally aligned with no voltage application thereto, and subjected to twist alignment of 60° to 120°. The TN mode liquid crystal cell is the most frequently used as a color TFT liquid crystal display device, and there are descriptions in many literatures.

In a VA mode liquid crystal cell, rod-like liquid crystalline molecules are substantially vertically aligned with no voltage application thereto. The VA mode liquid crystal cell may be any one of (1) a VA mode liquid crystal cell in the narrow sense in which rod-like liquid crystalline molecules are substantially vertically aligned with no voltage application thereto, but are substantially horizontally aligned in the presence of voltage application thereto (described in JP1990-176625A (JP-H2-176625A)); (2) a multi-domain VA mode (MVA mode) liquid crystal cell for view angle enlargement (described in SID97, Digest of tech. Papers (proceedings) 28 (1997), 845), (3) an (n-ASM mode) liquid crystal cell in which rod-like liquid crystalline molecules are substantially vertically aligned with no voltage application thereto, but are subjected to twist multi-domain alignment in the presence of voltage Application thereto (described in proceedings of Japan Liquid Crystal Debating Society, 58 to 59 (1998)), and (4) a SURVIVAL mode liquid crystal cell (published in LCD International 98). In addition, the VA mode liquid crystal cell may be any one of a patterned vertical alignment (PVA) type, an optical alignment type, and a polymer-sustained alignment (PSA) type. The details of the modes are described in JP2006-215326A and JP2008-538819A.

In an IPS mode liquid crystal cell, rod-like liquid crystal molecules are aligned to be substantially parallel to the substrate, an electric field parallel to a substrate surface is applied, and thus the liquid crystal molecules planarly respond. In the IPS mode, black display is performed in a state of no electric field application, and the absorption axes of a pair of upper and lower polarizing plates are perpendicular to each other. A method of improving a view angle by reducing light leakage at the time of black display in an oblique direction using an optical compensation sheet is disclosed in JP1998-54982A (JP-1110-54982A), JP1999-202323A (JP-H11-202323A), JP1997-292522A (JP-H09-292522A), JP1999-133408A (JP-H11-133408A), JP1999-305217A (JP-1111-305217A), JP1998-307291A (JP-1110-307291A), and the like.

EXAMPLES

Hereinafter, the invention will be more specifically described based on examples. Materials, used amounts, ratios, treatment contents, treatment sequences, and the like of the following examples are able to be suitably changed unless the changes cause deviance from the gist of the invention. Therefore, the range of the invention will not be restrictively interpreted by the following examples.

Examples 1 to 4 and Comparative Examples 1 and 2

(1) Production of Polymer Film

[Preparation of Outer Layer Cellulose Acylate Dope 1]

The following composition was put into a mixing tank and stirred to dissolve the respective components.

Next, the obtained solution was heated for about 10 minutes at 90° C., and then filtered through filter paper having an average pore diameter of 34 μm and a sintered metal filter having an average pore diameter of 10 μm to prepare a cellulose acylate solution 1.

| Composition of Cellulose Acylate Solution 1 | |
|---|---|
| Cellulose Acetate Having Acetyl Substitution Degree of 2.81 | 100 parts by mass |
| Polycondensation Polyester Described in Following Table 1 | 19 parts by mass |
| Following Compound 1-1 | 5 parts by mass |
| Methylene Chloride (first solvent) | 382 parts by mass |
| Methanol (second solvent) | 57 parts by mass |

TABLE 1

| | Glycol Unit | | | Dicarboxylic Acid Unit | | | |
|---|---|---|---|---|---|---|---|
| Sealing Rates of Both Terminals (mol %) | Ethylene Glycol (mol %) | 1,2-Propanediol (mol %) | Average Number of Carbon Atoms | Terephthalic Acid (mol %) | Succinic Acid (mol %) | Average Number of Carbon Atoms | Number Average Molecular Weight |
| 100 mol % Acetyl Group | 50 | 50 | 2.5 | 55 | 45 | 6.2 | 1,000 |

Compound 1-1

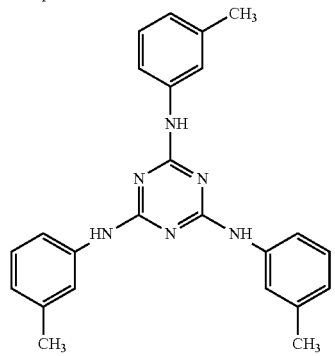

The following components including the cellulose acylate solution 1 prepared as described above were put into a dispersing machine to prepare a fine particle dispersion liquid 1.

| Composition of Fine Particle Dispersion Liquid 1 | |
|---|---|
| Silica Particles Having Average Particle Size of 20 nm (AEROSIL R972, manufactured by Nippon Aerosil Co., Ltd.) | 0.2 parts by mass |
| Methylene Chloride (first solvent) | 72.4 parts by mass |
| Methanol (second solvent) | 10.8 parts by mass |
| Cellulose Acylate Solution 1 | 10.3 parts by mass |

10 parts by mass of the prepared fine particle dispersion liquid 1 was mixed with 100 parts by mass of the cellulose acylate solution 1 prepared as described above to prepare an outer layer cellulose acylate dope 1.

[Preparation of Core Layer Cellulose Acylate Dope 1]

A core layer cellulose acylate dope 1 was prepared in the same manner as in the case of the outer layer cellulose acylate dope 1, except that a cellulose triacetate having an acetyl substitution degree of 2.44 was used in place of the cellulose acetate having an acetyl substitution degree of 2.81 in the preparation of the cellulose acylate solution.

[Production of Cellulose Acylate Film]

Three layers of a three-layer film having the core layer cellulose acylate dope 1 as an inner layer and the outer layer cellulose acylate dope 1 as an outer layer on both sides of the core layer cellulose acylate dope were cast using a band casting machine having a stainless-steel band.

The web (film) obtained by casting was peeled off from the band, and then a pass roll was transported to perform drying for 20 minutes at a drying temperature of 120° C. The drying temperature mentioned herein refers to a film surface temperature of the film.

After the drying, the obtained web (film) was held by a clip and stretched in a direction (TD) perpendicular to a film transport direction (MD) using a tenter at a stretching temperature of 189° C. with a stretching ratio of 70% under uniaxial stretching conditions at the fixed end, and a cellulose acylate film 1 was produced.

[Coating with Organic Acid Solution]

The following compositions were mixed and cooled to −70° C. to dissolve the cellulose acetate in the solution, and an organic acid solution 1 was prepared.

| Composition of Organic Acid Solution 1 | |
|---|---|
| Cellulose Acetate Having Acetyl Substitution Degree of 2.81 | 100 parts by mass |
| Glycerin Citric Acid Oleic Acid Ester (POEM K-37V, manufactured by RIKEN VITAMIN Co., Ltd.) | 75 parts by mass |
| Following Compound 1-2 | 75 parts by mass |
| Silica Particles Having Average Primary Particle Diameter of 1.2 nm (MEK-ST, manufactured by Nissan Chemical Industries, Ltd.) | 28.5 parts by mass |
| Methyl Acetate | 2,237 parts by mass |
| Methyl Ethyl Ketone | 1,864 parts by mass |
| Propylene Glycol Monomethyl Ether Acetate | 41 parts by mass |

Compound 1-2

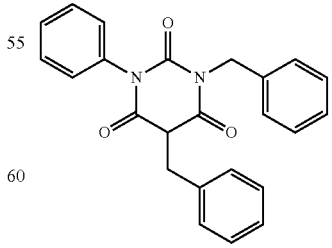

The organic acid solution 1 was applied to one surface of the cellulose acylate film 1 after the stretching using a wire bar coater #8 and dried for 120 seconds at 60° C.

[Saponification Treatment]

The cellulose acylate film 1 coated with the organic acid solution 1 was immersed in a sodium hydroxide aqueous solution of 2.3 mol/L for 3 minutes at 55° C.

Next, the film was washed in a water washing bath at room temperature and neutralized using a 0.05 mol/L sulfuric acid at 30° C. Then, the film was washed again in the water washing bath at room temperature and dried with hot air at 100° C.

In this manner, a saponification treatment was performed on the surface (both sides) of the cellulose acylate, film 1.

The thickness of the obtained cellulose acylate film 1 was 39 μm.

(2) Formation of Interlayer

The following compositions were mixed to prepare an interlayer coating liquid 1.

The prepared interlayer coating liquid 1 was applied to a surface of the cellulose acylate film 1 obtained as described above, on the side opposite to the surface coated with the organic acid solution 1, using a wire bar coater #1.6.

Next, after drying for 30 seconds at a film surface temperature of 60° C., ultraviolet irradiation was performed for 30 seconds at 30° C. using a high-pressure mercury lamp of 120 W/cm to crosslink an interlayer.

The thickness of the obtained interlayer was 0.6 μm.

| Composition of Interlayer Coating Liquid 1 | |
|---|---|
| Following Acrylic Compound Mixture | 100 parts by mass |
| Photopolymerization Initiator (IRGACURE 127, manufactured by BASF SE) | 4 parts by mass |
| Cyclohexanone | 589 parts by mass |

As the acrylic compound mixture, a mixture in which the mass ratio (ACR1/ACR2) between the following ACR1 and ACR2 was 67/33 was used.

ACR1: BLEMMER GLM (manufactured by NOF CORPORATION, compound having the following structure)

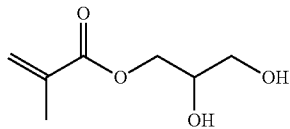

ACR2: KAYARAD PET30 (manufactured by Nippon Kayaku Co., Ltd., mixture of compounds having the following structure (pentaerythritol triacrylate/pentaerythritol tetraacrylate))

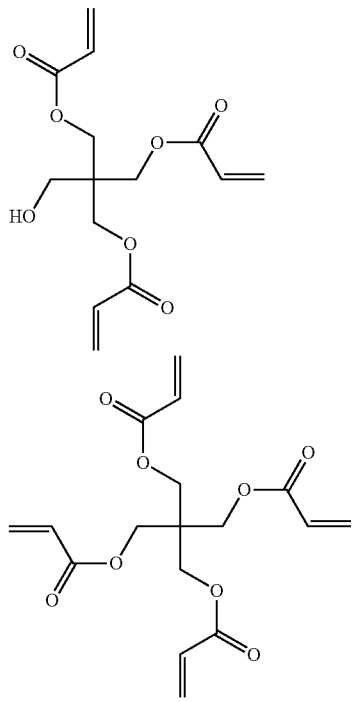

(3) Formation of Optical Anisotropic Layer

The following compositions were mixed and dissolved to prepare an optical anisotropic layer coating liquid A.

The optical anisotropic layer coating liquid A was applied to the interlayer of the cellulose acylate film formed up to the interlayer using a wire bar #3.2.

The film was attached to a metal frame and heated for 2 minutes in a constant-temperature tank at 100° C. to align the liquid crystal compound (homeotropic alignment).

Next, after cooling at 50° C., ultraviolet irradiation was performed at an irradiation dose of 300 mJ/cm$^2$ and an illuminance of 190 mW/cm$^2$ using an air-cooled metal halide lamp (manufactured by EYE GRAPHICS Co., Ltd.) of 160 W/cm at an oxygen concentration of about 0.1% under nitrogen purge to cure an optical anisotropic layer A.

The thickness of the optical anisotropic layer A was 1.3 μm. Re of the optical anisotropic layer A at a wavelength of 550 nm was 0 nm, and Rth of the optical anisotropic layer at a wavelength of 550 nm was −165 nm.

| Composition of Optical Anisotropic Layer Coating Liquid A | |
|---|---|
| Liquid Crystal Compound (following B01) | 72 parts by mass |
| Liquid Crystal Compound (following B02) | 18 parts by mass |
| Photopolymerization initiator (IRGACURE 907, manufactured by BASF SE) | 3 parts by mass |
| Sensitizer (KAYACURE DETX, manufactured by Nippon Kayaku Co., Ltd.) | 1 part by mass |
| Vertical Alignment Agent (following S01) | 0.1 parts by mass |
| Methyl Ethyl Ketone | 397 parts by mass |
| Cyclohexanone | 64 parts by mass |

Composition of Optical Anisotropic Layer Coating Liquid A

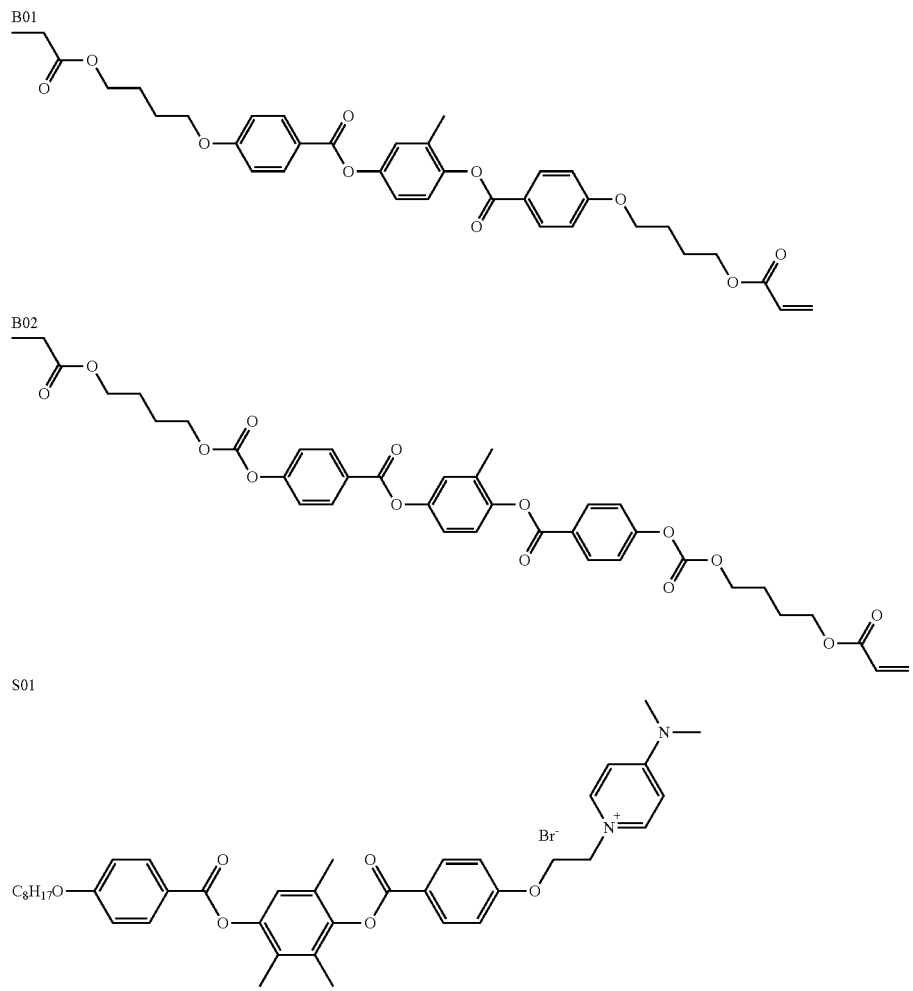

(4) Formation of Masking Layer

Coating liquids K-1, to K-6 for a masking layer were prepared as shown in the following Table 2.

TABLE 2

| | | Coating Liquid For Masking Layer | | | | | |
|---|---|---|---|---|---|---|---|
| | Material | K-1 | K-2 | K-3 | K-4 | K-5 | K-6 |
| Pigment Dispersion | K-Pigment Dispersion (solid content: 20.47%) | 31.20 | 31.20 | 31.20 | 31.20 | 31.20 | 31.20 |
| | R-Pigment Dispersion (solid content: 30%) | 3.30 | 3.30 | 3.30 | 3.30 | 3.30 | 3.30 |
| Photopolymerizable Compound | Tricyclodecane Dimethanol Diacrylate A-DCP | | 1.80 | | | | |
| | Urethane Acrylate UA-306H | | | 7.48 | | 12.88 | |
| | Urethane Acrylate U-200PA | | | | 7.48 | | 12.88 |
| | DPHA Liquid | 5.50 | 4.88 | | | | |
| Binder | Binder Z | 10.80 | | 7.50 | 7.50 | 2.10 | 2.10 |
| | Compound A | | 7.50 | | | | |
| Polymerization Initiator | 2,4-Bis(trichloromethyl)-6-[4'-(N,N-bis(ethoxycarbonylmethyl)amino-3'-bromophenyl]-s-triazine | 0.40 | 0.40 | 0.40 | 0.40 | 0.40 | 0.40 |
| Polymerization Inhibitor | Phenothiazine | 0.01 | 0.01 | 0.01 | 0.01 | 0.01 | 0.01 |
| Thermal Crosslinking Agent | DURANATE TPA-B80E | | 2.00 | | | | |

TABLE 2-continued

|  | Material | Coating Liquid For Masking Layer | | | | | |
|---|---|---|---|---|---|---|---|
|  |  | K-1 | K-2 | K-3 | K-4 | K-5 | K-6 |
| Coating Auxiliary Agent | MEGAFAC F780 (manufactured by DIC Corporation) | 0.10 | 0.10 | 0.10 | 0.10 | 0.10 | 0.10 |
| Solvent | Methyl Ethyl Ketone | 33.99 | 34.11 | 35.31 | 35.31 | 35.31 | 35.31 |
|  | Propylene Glycol Monomethyl Ether Acetate | 6.20 | 6.20 | 6.20 | 6.20 | 6.20 | 6.20 |
|  | Cyclohexanone | 8.50 | 8.50 | 8.50 | 8.50 | 8.50 | 8.50 |
|  | Total (parts by mass) | 100 | 100 | 100 | 100 | 100 | 100 |

In the above Table 2, details of the K-pigment dispersion and the like are as follows.

| Composition of K-Pigment Dispersion | |
|---|---|
| Carbon Black (trade name: Nipex 35, manufactured by EVONIK) | 13.1 parts by mass |
| Following Dispersing Agent 1 | 0.65 parts by mass |
| Binder 1 (random copolymer having molar ratio of benzyl methacrylate to methacrylic acid of 72/28, weight average molecular weight 3.70000) | 6.72 parts by mass |
| Propylene Glycol Monomethyl Ether Acetate | 79.53 parts by mass |

Dispersing Agent 1

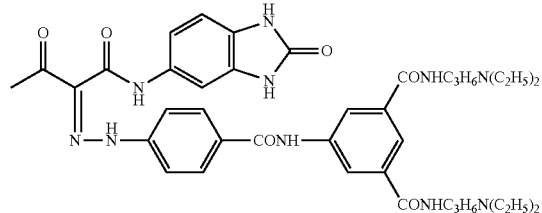

| Composition of R-Pigment Dispersion | |
|---|---|
| Pigment (C. I. Pigment Red 177) | 18 parts by mass |
| Binder 1 (random copolymer having molar ratio of benzyl methacrylate to methacrylic acid of 72/28, weight average molecular weight 3.70000) | 12 parts by mass |
| Propylene Glycol Monomethyl Ether Acetate | 70 parts by mass |

Tricyclodecane Dimethanol Diacrylate A-DCP: manufactured by SHIN.NAKAMURA CHEMICAL CO., L:17D.
Urethane Acrylate UA-306H: manufactured by KYOEISHA CHEMICAL Co., LTD.
Urethane Acrylate U-200PA: manufactured by SRN-NAKAMURA CHEMICAL CO., ETD.
DPHA Liquid: Mixed liquid of 38 mass % of dipentaerythritol hexaacrylate, 38 mass % of dipentaerythritol pentaarrylate, and 24 mass % of 1-methoxy-2-propyl acetate Binder Z: Random copolymer (weight average molecular weight 3.80000) having molar ratio of benzyl methacrylate to methacrylic acid of 78/22
Structural Formula of Compound A (acid value: 96 mgKOH/g) (in the following formula, x/l/y/z = 46/2/32/20)

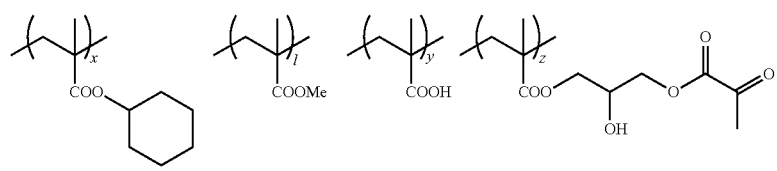

Phenothiazine: manufactured by Wako Pure Chemical Industries, Ltd.
DURANATE TPA-B80E: manufactured by Asahi Kasei Corporation
MEGAFAC F780: manufactured by DIC Corporation The prepared coating liquids K-1 to K-6 for a masking layer were respectively applied to the optical anisotropic layer A formed as described above, and dried to obtain laminates 1 to 6 having a masking layer having a thickness of 2.2 μm.

(5) Production of Optical Laminate

First, stretching was performing in a longitudinal direction with a circumferential speed difference given between two pairs of nip rolls according to Example 1 of JP2001-141926A, and a polarizer having a width of 1,330 mm and a thickness of 15 μm was produced. The polarizer produced in this manner was used as a polarizer 1.

Next, each of the laminates produced previously was stuck to the polarizer 1 using an adhesive.

In this case, a surface of the cellulose acylate film of the laminate coated with the organic acid solution 1 was stuck to the polarizer 1.

Next, to a surface of the polarizer 1 on the opposite side (surface which was not stuck to the laminate), FUJITAC TD80 (manufactured by Fujifilm Corporation) was stuck to produce optical laminates 1 to 6.

(6) Patterning of Masking Layer

Pattern exposure was performed from the masking layer side with an exposure amount of 200 mJ/cm$^2$ (i-ray) at an illuminance of 30 mW/cm$^2$ (i-ray) on the optical laminates 1 to 6 with a distance of 200 μm between a surface of an exposure mask (quartz exposure mask having a pattern for forming a masking layer) and a surface of the optical laminate on the masking layer side by using a proximity-type exposure machine (manufactured by Hitachi High-Technologies Corporation) having a ultrahigh-pressure mercury lamp.

After the exposure, development was performed for 45 seconds at a shower pressure set to 0.1 MPa at 32° C. using a sodium carbonate/sodium hydrogen carbonate-based developer (liquid obtained by diluting T-CD1 (trade name) (manufactured by Fujifilm Corporation) five times with pure water), and washing was performed with pure water. Next, the moisture of the surface of the optical laminate was removed by blowing air.

Next, using the above-described proximity-type exposure machine, the entire surface was exposed without the mask with an exposure amount of 1,000 mJ/cm$^2$ (i-ray).

Then, a post-baking treatment was perforated for 30 minutes at 145° C., and the optical laminates 1 to 6 having a patterned masking layer, that is, polarizing plates 1 to 6 were obtained.

<Hardness>

Regarding the optical laminates and the polarizing plates produced in Examples 1 to 4 and Comparative Examples 1 and 2, hardness HB of the masking layer and hardness HA of the optical anisotropic layer adjacent to the masking layer were measured by the above-described measurement method using a microhardness tester (HM-2000, manufactured by FISCHER INSTRUMENTS K.K.). The results thereof are shown in the following Table 3. The hardness in the optical laminate and the hardness in the polarizing plate were the same values.

<Workability (Presence or Absence of Occurrence of Cracks)>

The optical laminates produced in Examples 1 to 4 and Comparative Examples 1 and 2 were cut into a desired size by a cutting plotter, and workability thereof was evaluated.

Specifically, 20 A4-sized samples were cut from each optical laminate, and their appearance, especially, a space between the masking layer and the layer adjacent to the masking layer (optical anisotropic layer) was visually confirmed to confirm the presence or absence of the occurrence of cracks.

An optical laminate in which it was possible to confirm the occurrence of cracks in two or more of 20 samples was evaluated as "B" as an optical laminate having poor workability; and an optical laminate in which it was not possible to confirm the occurrence of cracks and an optical laminate in which it was possible to confirm the occurrence of cracks in only one sample were evaluated as "A" as an optical laminate having excellent workability.

TABLE 3

|  | Examples | | | | Comparative Examples | |
| --- | --- | --- | --- | --- | --- | --- |
|  | 1 | 2 | 3 | 4 | 1 | 2 |
| Coating Liquid for Masking Layer | K-1 | K-2 | K-3 | K-4 | K-5 | K-6 |
| Hardness HA of Optical Anisotropic Layer (N/mm$^2$) | 223 | 223 | 223 | 223 | 223 | 223 |
| Hardness HB of Masking Layer (N/mm$^2$) | 206 | 242 | 347 | 121 | 463 | 52 |
| Workability | A | A | A | A | B | B |

From the results shown in Table 3, it was found that in Comparative Examples 1 and 2 in which the hardness HB of the masking layer was out of the range ranging from 0.5 times to 2.0 times the hardness HA of the optical anisotropic layer, the optical laminate had poor workability.

However, it was found that in Examples 1 to 4 in which the hardness HB of the masking layer was within the range ranging from 0.5 times to 2.0 times the hardness HA of the optical anisotropic layer, the optical laminate had excellent workability and it was possible to suppress the occurrence of cracks in the polarizing plate.

<Production of Liquid Crystal Display Device>

A commercially available liquid crystal display device (iPad (registered trademark, the same hereinafter) manufactured by Apple Inc.) in which a polarizing plate on the visible side was peeled off from a liquid crystal cell was used as an WS mode liquid crystal cell.

In place of the peeled polarizing plate, the polarizing plate produced as described above was stuck to the liquid crystal cell, and each liquid crystal display device was produced.

In this case, the polarizing plate was stuck to the liquid crystal cell such that an absorption axis of the polarizing plate was perpendicular to an optical axis of the liquid crystal layer in the liquid crystal cell when observed in a direction perpendicular to the substrate surface of the liquid crystal cell.

The liquid crystal display device in which the polarizing plate was stuck to the liquid crystal cell was operated and confirmed to be operated without problems.

Example 5

(1) Production of Polymer Film

[Preparation of Core Layer Cellulose Acylate Dope 2]

The following compositions were put into a mixing tank and stirred to dissolve the respective components, and a core layer cellulose acylate dope 2 was prepared.

| | |
|---|---|
| Cellulose Acetate Having Acetyl Substitution Degree of 2.38 | 100 parts by mass |
| Ester Oligomer (following compound 1-1) | 10 parts by mass |
| Durability Improver (following compound 1-2) | 4 parts by mass |
| Ultraviolet Absorbing Agent (following compound 1-3) | 3 parts by mass |
| Methylene Chloride (first solvent) | 438 parts by mass |
| Methanol second solvent) | 65 parts by mass |

(Compound 1-1)

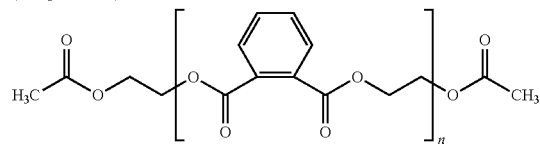

Molecular Weight: 1,000

(Compound 1-2)

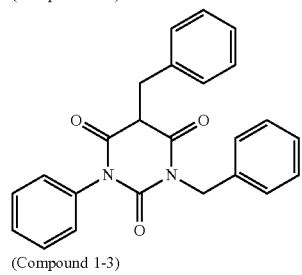

(Compound 1-3)

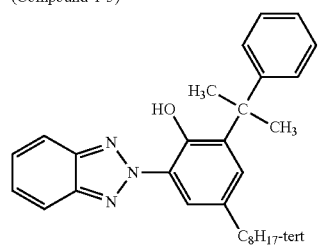

[Preparation of Outer Layer Cellulose Acylate Dope 2]

10 parts by mass of the following matting agent dispersion liquid 1 was added to 190 parts by mass of the core layer cellulose acylate dope 2 prepared as described above to prepare an outer layer cellulose acylate dope 2.

| | |
|---|---|
| Silica Particles Having Average Particle Size of 20 nm (AEROSIL R972, manufactured by Nippon Aerosil Co., Ltd.) | 2 parts by mass |
| Methylene Chloride (first solvent) | 76 parts by mass |
| Methanol (second solvent) | 11 parts by mass |
| Core Layer Cellulose Acylate Dope 2 | 1 part by mass |

[Production of Cellulose Acylate Film 2]

Three layers of a three-layer film having the core layer cellulose acylate dope 2 as an inner layer and the outer layer cellulose acylate dope 2 as an outer layer on both sides of the core layer cellulose acylate dope were simultaneously cast on a drum at 20° C. from a casting outlet.

Next, the film was stripped off from the drum in a state in which the solvent content was about 20 mass %. The film was fixed at both ends thereof in a width direction (direction (TD) perpendicular to the transport direction (MD)) of the film by a tenter clip, and in a state in which the residual solvent was 3 to 15 mass %, the film was dried while being stretched 1.2 times in the width direction.

Then, the film was transported between rolls of a heat treatment device, and thus a cellulose acylate film 2 having a thickness of 25 μM was produced.

(2) Production of Hard Coat Layer

A curable composition hard coating 1 for a hard coating described in the following Table 4 was prepared as a coating liquid for forming a hard coat layer.

TABLE 4

| | Monomer | | | | UV Initiator | | |
|---|---|---|---|---|---|---|---|
| | Monomer 1 | Monomer 2 | Monomer 1/Monomer 2 | Total Amount Added [parts by mass] | Type | Added Amount [parts by mass] | Solvent |
| Hard Coating 1 | Pentaerythritol triacrylate | Pentaerythritol tetraacrylate | 3/2 | 53.5 | UV Initiator 1 | 1.5 | Ethyl Acetate |

(Compound 2-1)

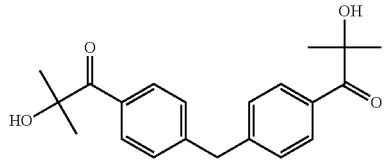 [SMILES: CC(C)(O)C(=O)c1ccc(Cc2ccc(C(=O)C(C)(C)O)cc2)cc1]

UV Initiator 1

The hard coating 1 was applied to a surface of the cellulose acylate film 2 produced as described above, and then dried for 60 seconds at 100° C. and subjected to ultraviolet irradiation for curing under the conditions of 1.5 kW, 300 mJ, and 0.1% or less of nitrogen to produce a cellulose acylate film 2 with a hard coat layer having a thickness of 5 pin.

The thickness of the hard coat layer was adjusted by adjusting the coating amount in the die coating method using a slot die.

(3) Production of Polarizer

Stretching was performing in a longitudinal direction with a circumferential speed difference given between two pairs of nip rolls according to Example 1 of JP2001-141926A, and a polarizer having a width of 1,330 mm and a thickness of 15 μm was produced. The polarizer produced in this manner was used as a polarizer 2.

(4) Lamination of Polarizer

The produced cellulose acylate film 2 with a hard coat layer was immersed for 1 minute in a sodium hydroxide aqueous solution (saponification liquid) of 4.5 mol/L, having a temperature adjusted to 37° C. Then, the film was washed with water. Thereafter, the film was immersed for 30 seconds in a sulfuric acid aqueous solution of 0.05 mol/L, and then passed through a water washing bath. Dewatering was repeated three times by an air knife, and after the dropping of water, the film was dried by being kept for 15 seconds in a drying zone at 70° C. to produce a cellulose acylate film 2 with a saponified hard coat layer.

The polarizer 2 produced as described above and the cellulose acylate film 2 with a saponified hard coat layer were stuck to each other in a roll-to-roll manner using an aqueous solution of 3% PVA (manufactured by KURARAY COL., LTD., PVA-117H) as an adhesive such that a polarization axis is perpendicular to the longitudinal direction of the film, and thus a laminate 7 was produced.

In this case, the cellulose acylate film was stuck so as to be on the polarizer side.

(5) Formation of First Optical Anisotropic Layer

A surface of the laminate 7 on the side of the polarizer 2 was subjected to a rubbing treatment in a direction perpendicular to the absorption axis of the polarizer 2. The following coating liquid B for an optical anisotropic layer was applied to the surface subjected to the rubbing treatment using a bar coater with a bar number #2.4.

Next, heat aging was performed for 30 seconds at a film surface temperature of 60° C., and then 290 mJ/cm² of ultraviolet irradiation was performed using an air-cooled metal halide lamp (manufactured by EYE GRAPHICS Co., Ltd.) in the air at a film surface temperature of 60° C. to fix the alignment state, and thus a first optical anisotropic layer was formed.

In the formed first optical anisotropic layer, the rod-like liquid crystal compound was horizontally aligned, and the slow axis direction was a direction parallel to the rubbing direction, that is, perpendicular to the absorption axis direction of the polarizer. Light incident angle dependence of each of Re and Rth was measured using an automatic birefringence index meter (KOBRA-21ADH, manufactured by Oji Scientific Instruments) Re was 128 nm and Rth was 64 nm at a wavelength of 550 nm.

| Composition of Coating Liquid B tbr Optical Anisotropic Layer | |
|---|---|
| Rod-Like Liquid Crystal Compound 1 | 80 parts by mass |
| Rod-Like Liquid Crystal Compound 2 | 20 parts by mass |
| Photopolymerization Initiator 1 (IRGACURE 907, manufactured by BASF SE) | 3.0 parts by mass |
| Sensitizer (KAYACURE DETX, manufactured by Nippon Kayaku Co., Ltd.) | 1.0 part by mass |
| Fluorine-Containing Compound A | 0.8 parts by mass |
| Methyl Ethyl Ketone | 213 parts by mass |

Rod-Like Liquid Crystal Compound 1

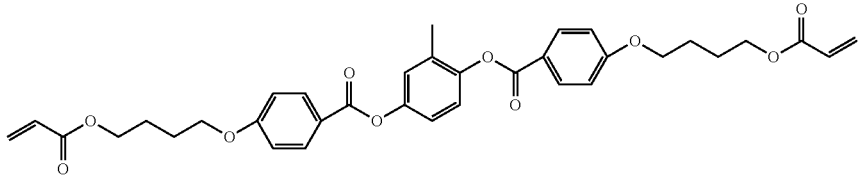 [SMILES: C=CC(=O)OCCCCOc1ccc(C(=O)Oc2ccc(OC(=O)c3ccc(OCCCCOC(=O)C=C)cc3)c(C)c2)cc1]

Rod-Like Liquid Crystal Compound 2

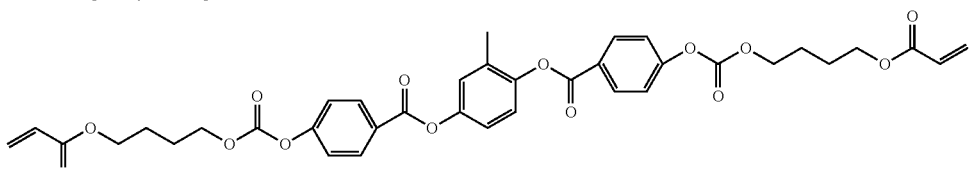

Photopolymerization Initiator 1

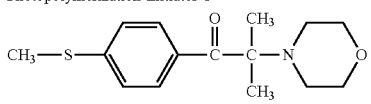

Sensitizer

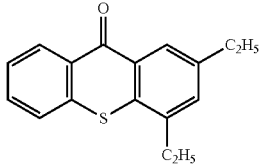 [SMILES: CCc1cc(CC)c2sc3ccccc3c(=O)c2c1]

| Composition of Coating Liquid B for Optical Anisotropic Layer |
|---|

Fluorine-Containing Compound A

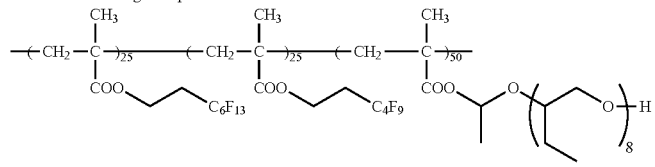

(6) Formation of Alignment Film.

An alignment film coating liquid having the following composition was applied to a surface of the first optical anisotropic layer produced as described above using a wire bar #14. The alignment film coating liquid was dried for 120 seconds with hot air at 60° C. to form an alignment film.

| Composition of Alignment Film Coating Liquid | |
|---|---|
| Following Modified Polyvinyl Alcohol | 10 parts by mass |
| Water | 245 parts by mass |
| Methanol | 245 parts by mass |
| Glutaraldehyde | 0.5 parts by mass |

Modified Polyvinyl Alcohol

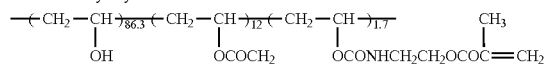

(7) Production of Second Optical Anisotropic Layer

The following coating liquid C for an optical anisotropic layer was applied to the alignment film using a bar coater with a bar number #2.4.

Next, heat aging was performed for 30 seconds at a film surface temperature of 60° C., and then 290 mJ/cm$^2$ of ultraviolet irradiation was performed using an air-cooled metal halide lamp (manufactured by EYE GRAPHICS Co., Ltd.) in the air at a film surface temperature of 60° C. to fix the alignment state, and thus a second optical anisotropic layer was formed.

In the formed second optical anisotropic layer, the rod-like liquid crystal compound was vertically aligned. Light incident angle dependence of each of Re and Rth was measured using an automatic birefringence index meter (KOBRA-21ADH, manufactured by Oji Scientific Instruments), Re was 0 and Rth was −115 nm at a wavelength of 550 nm.

| Composition of Coating Liquid C for Optical Anisotropic Layer | |
|---|---|
| Rod-Like Liquid Crystal Compound 1 | 80 parts by mass |
| Rod-Like Liquid Crystal Compound 2 | 20 parts by mass |
| Photopolymerization Initiator 1 (IRGACURE 907, manufactured by BASF SE) | 3.0 parts by mass |
| Sensitizer (KAYACURE DETX, manufactured by Nippon Kayaku Co., Ltd.) | 1.0 part by mass |
| Following Fluorine-Containing Compound B | 0.8 parts by mass |
| Following Vertical Alignment Agent 1 | 1.0 part by mass |
| Following Adhesion Enhancing Agent 1 | 0.25 parts by mass |
| Methyl Ethyl Ketone | 251 parts by mass |

Fluorine-Containing Compound B

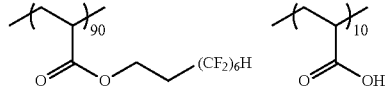

Vertical Alignment Agent 1

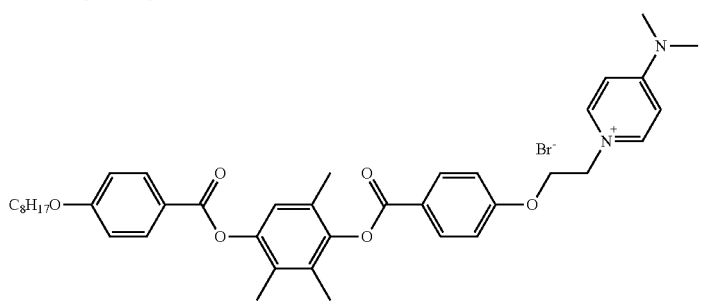

-continued

Composition of Coating Liquid C for Optical Anisotropic Layer

Adhesion Enhancing Agent 1

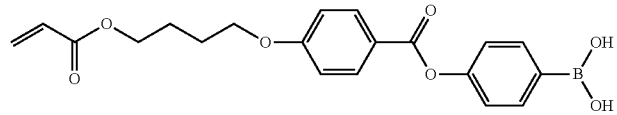 [SMILES: C=CC(=O)OCCCCOc1ccc(C(=O)Oc2ccc(B(O)O)cc2)cc1]

(8) Formation of Masking Layer

The coating liquid K-1 for a masking layer prepared in Example 1 was applied to the second optical anisotropic layer formed as described above, and was dried to obtain an optical laminate 7 having a masking layer having a thickness of 2.2 μm.

(9) Patterning of Masking Layer

Pattern exposure was performed with an exposure amount of 200 mJ/cm² (i-ray) at an illuminance of 30 mW/cm² (i-ray) on the optical laminate 7 with a distance of 200 μm between a surface of an exposure mask (quartz exposure mask having a pattern for forming a masking layer) and a surface of the optical Laminate on the masking layer side by using a proximity-type exposure machine (manufactured by Hitachi High-Technologies Corporation) having a ultrahigh-pressure mercury lamp.

After the exposure, development was performed for 45 seconds at a shower pressure set to 0.1 MPa at 32° C. using a sodium carbonate/sodium hydrogen carbonate-based developer (liquid obtained by diluting T-CD1 (trade name) (manufactured by Fujifilm Corporation) five times with pure water), and washing was performed with pure water. Next, the moisture of the surface of the optical laminate was removed by blowing air.

Next, using the above-described proximity-type exposure machine, the entire surface was exposed without the mask with an exposure amount of 1,000 mJ/cm² (i-ray). Finally, a post-baking treatment was performed for 30 minutes at 145° C., and thus a polarizing plate 7 having a patterned masking layer was obtained.

<Hardness and Workability>

Regarding the produced optical anisotropic layer 7, the hardness was measured and the workability was evaluated in the same manner as in Example 1.

As a result, the hardness HB of the masking layer was 206 N/mm², and the hardness HA of the second optical anisotropic layer adjacent to the masking layer was 228 N/mm².

In the workability evaluation, it was found that the workability was evaluated to be A since the occurrence of cracks was not confirmed.

<Production of Liquid Crystal Display Device>

A liquid crystal display device was produced in which polarizing plates on the visible side and on the backlight side were peeled off from the liquid crystal cell of a commercially available liquid crystal display device (iPad, manufactured by Apple Inc.), the above-described polarizing plate 7 was used as the polarizing plate on the visible side, the following polarizing plate 8 was used as the polarizing plate on the backlight side, and the polarizing plates were stuck such that absorption axes of the polarizers included in the respective polarizing plates were perpendicular to each other.

The liquid crystal display device in which the polarizing plates were stuck to the liquid crystal cell was operated and confirmed to be operated without problems.

(Polarizing Plate 8)

A laminate produced in the same manner as in the case of the laminate 7, except that no hard coat layer was provided in the production of the laminate 7, was used as the polarizing plate 8.

EXPLANATION OF REFERENCES

1: polarizer
2: optical anisotropic layer
3: masking layer
4, 5: polymer film
10: optical laminate
20: polarizing plate
21: pressure sensitive adhesive layer
22: display element
30: image display device

What is claimed is:

1. An optical laminate comprising in order:
a polarizer;
an optical anisotropic layer; and
a masking layer,
wherein a thickness of the optical anisotropic layer is 1.0 μm to 5 μm,
the masking layer contains a black colorant or a white colorant, and
hardness HB of the masking layer and hardness HA of the optical anisotropic layer which is adjacent to the masking layer satisfy Expression (1), $$HA \times 0.5 \leq HB \leq HA \times 2 \tag{1}.$$

2. A method of manufacturing a polarizing plate to produce a polarizing plate comprising in order:
a polarizer;
an optical anisotropic layer; and
a masking layer,
wherein a thickness of the optical anisotropic layer is 1.0 μm to 5 μm,
the masking layer is only provided in a peripheral portion of the optical anisotropic layer which is adjacent to the masking layer, and
hardness HB of the masking layer and hardness HA of the optical anisotropic layer which is adjacent to the masking layer satisfy Expression (1), $$HA \times 0.5 \leq HB \leq HA \times 2 \tag{1},$$

the method comprising:
a cutting step of cutting the optical laminate according to claim 1 in a thickness direction to produce the polarizing plate.

3. The method of manufacturing a polarizing plate according to claim 2, further comprising:
a patterning step of removing a part of the masking layer in a portion which is not cut in the cutting step before or after the cutting step.

4. The optical laminate according to claim 1,
wherein the optical anisotropic layer satisfies Expression (I), $$100 \leq Re(550) \leq 180 \text{ nm} \qquad (I),$$

herein Expression (I), Re (550) represents in-plane retardation of the optical anisotropic layer at a wavelength of 550 nm.

5. The optical laminate according to claim 1,
wherein the optical anisotropic layer is a layer having a liquid crystal compound.

6. A polarizing plate comprising in order:
a polarizer;
an optical anisotropic layer; and
a masking layer,
wherein a thickness of the optical anisotropic layer is 1.0 μm to 5 μm,
the masking layer is only provided in a peripheral portion of the optical anisotropic layer which is adjacent to the masking layer, and
hardness HB of the masking layer and hardness HA of the optical anisotropic layer which is adjacent to the masking layer satisfy Expression (1), $$HA \times 0.5 \leq HB \leq HA \times 2 \qquad (1).$$

7. An image display device comprising:
the polarizing plate according to claim 6; and
a display element.

8. The image display device according to claim 7,
wherein the image display device comprises in order:
the display element;
a masking layer;
an optical anisotropic layer; and
a polarizer.

9. An image display device comprising:
a liquid crystal cell; and
a pair of polarizing plates between which the liquid crystal cell is interposed,
wherein at least one of the pair of polarizing plates which is disposed on a visible side is the polarizing plate according to claim 6.

10. The polarizing plate according to claim 6,
wherein the optical anisotropic layer satisfies Expression (I), $$100 \leq Re(550) \leq 180 \text{ nm} \qquad (I),$$

herein Expression (I), Re (550) represents in-plane retardation of the optical anisotropic layer at a wavelength of 550 nm.

11. The polarizing plate according to claim 6,
wherein the optical anisotropic layer is a layer having a liquid crystal compound.

12. The polarizing plate according to claim 6,
wherein the masking layer contains a black colorant or a white colorant.

* * * * *